(12) United States Patent
Wang et al.

(10) Patent No.: US 10,923,102 B2
(45) Date of Patent: Feb. 16, 2021

(54) METHOD AND APPARATUS FOR BROADCASTING A RESPONSE BASED ON ARTIFICIAL INTELLIGENCE, AND STORAGE MEDIUM

(71) Applicant: BAIDU ONLINE NETWORK TECHNOLOGY (BEIJING) CO., LTD., Beijing (CN)

(72) Inventors: Yu Wang, Beijing (CN); Bo Xie, Beijing (CN)

(73) Assignee: Baidu Online Network Technology (Beijing) Co., LTD., Beijing (CN)

(*) Notice: Subject to any disclaimer, the term of this patent is extended or adjusted under 35 U.S.C. 154(b) by 176 days.

(21) Appl. No.: 15/991,411

(22) Filed: May 29, 2018

(65) Prior Publication Data
US 2018/0374474 A1    Dec. 27, 2018

(30) Foreign Application Priority Data
Jun. 22, 2017    (CN) .......................... 2017 1 04806773

(51) Int. Cl.
*G10L 13/027*    (2013.01)
*G10L 25/63*    (2013.01)
*G10L 15/22*    (2006.01)
*G10L 15/18*    (2013.01)

(52) U.S. Cl.
CPC ........ *G10L 13/027* (2013.01); *G10L 15/1815* (2013.01); *G10L 15/22* (2013.01); *G10L 25/63* (2013.01); *G10L 2015/223* (2013.01)

(58) Field of Classification Search
CPC ... G10L 13/027; G10L 15/1815; G10L 15/22; G10L 25/63; G10L 2015/223; G10L 15/26; G06F 16/3344; G06F 16/3329; G06F 16/3343; G06F 40/30
USPC ........................................................ 704/275
See application file for complete search history.

(56) References Cited

U.S. PATENT DOCUMENTS

| 9,015,032 B2 | 4/2015 | Daye et al. | |
| 2014/0213222 A1* | 7/2014 | Roberts, II | H04W 4/14 455/412.1 |
| 2018/0060308 A1* | 3/2018 | Liu | G06F 40/274 |

(Continued)

FOREIGN PATENT DOCUMENTS

| CN | 101030368 A | 9/2007 |
| CN | 103543979 A | 1/2014 |
| CN | 104239515 A | 12/2014 |

(Continued)

OTHER PUBLICATIONS

Chinese Search Report dated Mar. 18, 2020 for related Chinese Appln. No. 2017104806773; 1 Page.

*Primary Examiner* — Thierry L Pham
(74) *Attorney, Agent, or Firm* — Brooks Kushman PC

(57) ABSTRACT

The present disclosure provides a method and apparatus for broadcasting a response based on artificial intelligence, and a storage medium, wherein the method comprises: obtaining a user-input speech query; generating a response corresponding to the query; obtaining a recorded speech of a mood meaning corresponding to a modal particle in the response and matched with the response; combining the obtained recorded speech with a TTS-generated speech to perform TTS broadcast of the response. The solution of the present disclosure may be applied to enhance an effect of broadcasting the response.

15 Claims, 3 Drawing Sheets

(56) References Cited

U.S. PATENT DOCUMENTS

2018/0314689 A1* 11/2018 Wang .................. G10L 15/1822

FOREIGN PATENT DOCUMENTS

| CN | 106486121 A | 3/2017 |
| CN | 106777236 A | 5/2017 |

* cited by examiner

METHOD AND APPARATUS FOR BROADCASTING A RESPONSE BASED ON ARTIFICIAL INTELLIGENCE, AND STORAGE MEDIUM

The present application claims the priority of Chinese Patent Application No. 2017104806773, filed on Jun. 22, 2017, with the title of "Method and apparatus for broadcasting a response based on artificial intelligence, and storage medium". The disclosure of the above applications is incorporated herein by reference in its entirety.

FIELD OF THE DISCLOSURE

The present disclosure relates to computer application technologies, and particularly to a method and apparatus for broadcasting a response based on artificial intelligence, and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

At present, smart speech devices increasingly prevail. A smart loudspeaker box is taken as an example. A user may interact with the smart loudspeaker box through speech. What converses with the user is a smart speech helper. The smart speech helper talks with the user through a Text To Speech (TTS) technology.

Upon talking with smart loudspeaker box, the user desires to talk with an emotional body like a human being, i.e., hopes the smart loudspeaker box to well express a tone, a mood and an emotion.

To this end, responses having modal particles are usually used in the prior art, i.e., after obtaining a user-input speech query, generate a response with a modal particle, and then perform TTS broadcast for the response. The modal particles may include words such as "haha (Chinese expression: 哈哈 )", "eh (Chinese expression: 哦 )" and so on.

However, current various smart loudspeaker boxes cannot well express mood meaning of the modal particles in different contexts. For example, "haha" has many kinds of mood meaning, for example, sneer, be perfunctory, happy, extremely excited and so on; "eh" has many kinds of mood meaning, for example, question, confirm, surprise and so on. However, current various smart loudspeaker box all can only express a single emotion, which reduces the effect of broadcasting responses.

SUMMARY OF THE DISCLOSURE

In view of the above, the present disclosure provides a method and apparatus for broadcasting a response based on artificial intelligence, and a storage medium, which can enhance an effect of broadcasting the response.

Specific technical solutions are as follows:

A method for broadcasting a response based on artificial intelligence, comprising:
obtaining a user-input speech query;
generating a response corresponding to the query;
obtaining a recorded speech of a mood meaning corresponding to a modal particle in the response and matched with the response;
combining the obtained recorded speech with a TTS-generated speech to perform TTS broadcast of the response.

According to a preferred embodiment of the present disclosure, the generating a response corresponding to the query comprises:
determining a demand corresponding to the query;
selecting one response-generating algorithm from M response-generating algorithms corresponding to the demand, M being a positive integer larger than 1;
using the selected response-generating algorithm to generate the response.

According to a preferred embodiment of the present disclosure, the determining a demand corresponding to the query comprises:
performing speech recognition for the query to obtain a speech recognition result;
determining the demand corresponding to the query by performing semantic parsing for the speech recognition result;
the selecting one response-generating algorithm from M response-generating algorithms corresponding to the demand comprises:
randomly selecting one response-generating algorithm from the M response-generating algorithms corresponding to the demand.

According to a preferred embodiment of the present disclosure, the obtaining a recorded speech of a mood meaning corresponding to a modal particle in the response and matched with the response comprises:
respectively performing the following processing with respect to each modal particle in the response:
configuring a mood meaning matched with the response for the modal particle;
obtaining a recorded speech corresponding to the mood meaning;
wherein the modal particle corresponds to at least one pre-generated recorded speech, and each recorded speech corresponds to a different mood meaning.

According to a preferred embodiment of the present disclosure, the combining the obtained recorded speech with a TTS-generated speech to perform TTS broadcast of the response comprises:
upon broadcasting the modal particle corresponding to the obtained recorded speech, broadcasting the obtained recorded speech, otherwise broadcasting the TTS-generated speech.

An apparatus for broadcasting a response based on artificial intelligence, comprising: a receiving unit, a generating unit, an obtaining unit and a broadcasting unit;
the receiving unit is configured to obtain a user-input speech query and send the speech query to the generating unit;
the generating unit is configured to generate a response corresponding to the query and send the response to the obtaining unit;
the obtaining unit is configured to obtain a recorded speech of a mood meaning corresponding to a modal particle in the response and matched with the response, and send the response and the recorded speech to the broadcasting unit;
the broadcasting unit is configured to combine the obtained recorded speech with a TTS-generated speech to perform TTS broadcast of the response.

According to a preferred embodiment of the present disclosure, the generating unit determines the demand corresponding to the query, selects one response-generating algorithm from M response-generating algorithms corresponding to the demand, M being a positive integer larger than 1, and uses the selected response-generating algorithm to generate the response.

According to a preferred embodiment of the present disclosure, the generating unit performs speech recognition for the query to obtain a speech recognition result, determines the demand corresponding to the query by performing semantic parsing for the speech recognition result, randomly selects a response-generating algorithm from the M response-generating algorithms corresponding to the demand, and uses the selected response-generating algorithm to generate the response.

According to a preferred embodiment of the present disclosure, the obtaining unit respectively performs the following processing with respect to each modal particle in the response:

configuring a mood meaning matched with the response for the modal particle;

obtaining a recorded speech corresponding to the mood meaning;

wherein the modal particle corresponds to at least one pre-generated recorded speech, and each recorded speech corresponds to a different mood meaning.

According to a preferred embodiment of the present disclosure, upon broadcasting the modal particle corresponding to the obtained recorded speech, the broadcasting unit broadcasts the obtained recorded speech, otherwise broadcasts the TTS-generated speech.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the solution of the above embodiment is employed to, after generating the response corresponding to the user-input query, obtain a recorded speech of a mood meaning corresponding to the modal particle in the response and matched with the response, and then combine the obtained recorded speech with the TTS-generated speech to perform TTS broadcast of the response. Since the recorded speech having the mood meaning is introduced for the modal particle and the combined broadcast of the recorded speech and TTS-generated speech is implemented, it is possible to better perform emotional expression of the response and thereby improve the broadcasting effect of the response.

In addition, according to the solution of the above embodiment, many types of response-generating algorithms are set to generate different responses for the same demand, thereby achieving diversity of responses and thereby avoiding the problem that the user always gets the same answer, so that the answers become more natural and richer, and therefore the fresh feeling and intelligent feeling are enhanced for the user.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
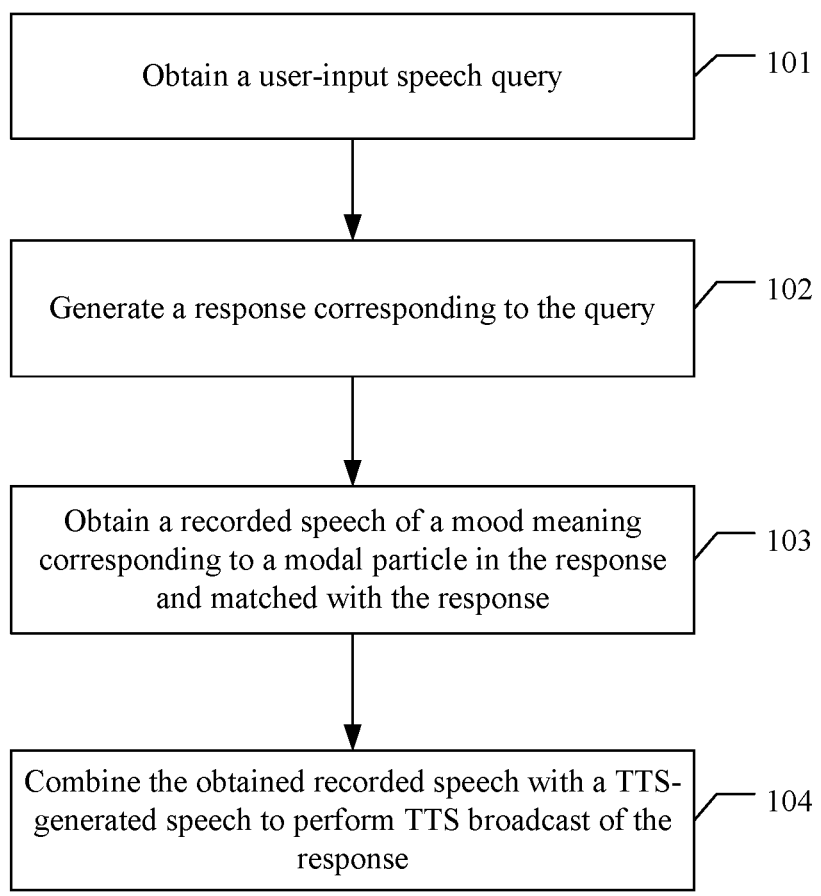
FIG. 1 is a flow chart of an embodiment of a method of broadcasting a response according to the present disclosure.

FIG. 1 is a flow chart of an embodiment of a method of broadcasting a response according to the present disclosure. As shown in FIG. 1, the embodiment comprises the following specific implementation mode.

In 101, a user-input speech query is obtained.

A smart loudspeaker box is taken as an example. A user may converse with the smart loudspeaker box through speech. During the conversation, the user-input speech is a query.

In 102 is generated a response corresponding to the query.

It is feasible to, after obtaining the user's query, first perform speech recognition for the query according to the prior art to obtain a speech recognition result, then perform semantic parsing for the speech recognition result, and determine a demand corresponding to the query.

Regarding a specific demand, e.g., a demand for playing a certain song of a certain singer, diverse responses rather than a single response may be provided.

Correspondingly, regarding each demand, M response-generating algorithms may be preset respectively, M is a positive integer larger than 1, and each response-generating algorithm corresponds to a different response.

As such, it is possible to, after determining the demand corresponding to the user-input query, select one response-generating algorithm from the M response-generating algorithms corresponding to the demand, and then use the selected response-generating algorithm to generate the response.

No limitations are imposed on how to select. For example, a response-generating algorithm may be randomly selected from the M response-generating algorithms.

The response-generating algorithm is also called a response-generating rule, i.e., it provides for content to be included in the responses.

The smart loudspeaker box is taken as an example. Assume that the user-input query is "play Jay Chou's Tornado (Chinese expression: 给 (gei) 我 (wo) 播 (bo) 放 (fang) 周 (zhou) 杰 (jie) 伦 (lun) 的 (de) 龙 (long) 卷 (juan) 风 (feng))", corresponding responses may be shown below in Table 1:

TABLE 1 responses corresponding to the query "play Jay Chou's Tornado"

1. Ok, I am also Jay Chou's fan, play Tornado for you right now
   (Chinese expression: 嗯(en)嗯(en), 我(wo)也(ye)是(shi)周(zhou)杰(jie)
   伦(lun)的(de)小(xiao)迷(mi)妹(mei)哦(o), 这(zhe)就(jiu)给(gei)你(ni)
   播(bo)放(fang)龙(long)卷(juan)风(feng))
2. Okay, let's listen to Jay Chou's Tornado together
   (Chinese expression: 好(hao)呀(ya), 我(wo)们(men)-(yi)起(qi)来(lai)
   听(ting)周(zhou)杰(jie)伦(lun)的(de)龙(long)卷(juan)风(feng))
3. OK, Jay Chou, Tornado
   (Chinese expression: OK, 周(zhou)杰(jie)伦(lun), 龙(long)卷(juan) 风(feng))
4. Woow, my favorite song, Jay Chou, Tornado
   (Chinese expression: 哇(wa), 我(wo)的(de)最(zui)爱(ai), 周(zhou)杰(jie)伦(lun) 龙(long)卷(juan)风(feng))
5. No problem, Tornado
   (Chinese expression: 没(mei)问(wen)题(ti), 龙(long)卷(juan)风(feng))
6. Good, let's listen to Jay Chou's Tornado together
   (Chinese expression: 好(hao)呀(ya), 我(wo)们(men)-(yi)起(qi)来(lai)
   听(ting)周(zhou)杰(jie)伦(lun)的(de)龙(long)卷(juan)风(feng))
7. Okay, a piece of cake for me the Chine song library, let's listen to Jay Chou's Tornado
   (Chinese expression: 好(hao)呔(de), 难(nan)不(bu)倒(dao)我(wo)中(zhong)华(hua)小(xiao)曲(qu)库(ku), 来(lai)听(ting)周(zhou)杰(jie)伦(lun)的(de)龙(long)卷(juan)风(feng))
8. Jay Chou, Tornado
   (Chinese expression: 周(zhou)杰(jie)伦(lun), 龙(long)卷(juan)风(feng))
9. OK, play Jay Chou's Tornado for you
   (Chinese expression: OK, 为(wei)你(ni)播(bo)放(fang)周(zhou)杰(jie)伦(lun)的(de)龙(long)卷(juan)风(feng))
10. No problem, play Jay Chou's Tornado for you
    (Chinese expression: 没(mei)问(wen)题(ti), 为(wei)你(ni)播(bo)放(fang)周(zhou)杰(jie)伦(lun)的(de)龙(long)卷(juan)风(feng))
11. As you ask, play Jay Chou's Tornado right now!
    (Chinese expression: 听(ting)你(ni)的(de), 那(na)就(jiu)播(bo)放(fang)周(zhou)杰(jie)伦(lun)的(de)龙(long)卷(juan)风(feng)啦(la)!)

Regarding the query "play Jay Chou's Tornado", any one of 11 responses as listed in Table may be generated randomly.

In 103 is obtained a recorded speech of a mood meaning corresponding to a modal particle in the response and matched with the response.

It is feasible to respectively pre-record speech corresponding to different mood meanings with respect to various modal particles that might be used in the responses.

At least one speech may be recorded with respect to each modal particle. Preferably, many types of speech may be recorded.

For example, speech indicative of mood meanings such as "question", "confirm" and "surprise" may be respectively pre-recorded with respect to the modal particle "eh (Chinese expression: 哦(o))".

As such, after the response corresponding to the query is generated in 102, processing may be respectively performed in the following manners with respect to each modal particle in the response:

configuring a mood meaning matched with the response for the modal particle;

obtaining a recorded speech corresponding to the mood meaning;

as stated above, the modal particle corresponds to at least one pre-generated recorded speech, and each recorded speech corresponds to a different mood meaning.

A matched mood meaning may be configured for the modal particle by performing semantic parsing for the response.

Take an example:

Speech indicative of mood meanings such as "question", "confirm" and "surprise" may be respectively pre-recorded with respect to the modal particle "eh (Chinese expression: 哦(o))".

Assume that the response is "eh? Luckily, I also like this song! Play Jay Chou's Tornado for you right now (Chinese expression: 哦(o)? 这(zhe)么(me)巧(qiao)! 我(wo)也(ye)喜(xi)欢(huan)这(zhe)首(shou)歌(ge)耶(ye), 马(ma)上(shang)为(wei)你(ni)播(bo)放(fang)周(zhou)杰(jie)伦(lun)的(de)龙(long)卷(juan)风(feng))", it may be determined through semantic parsing that "eh (Chinese expression: 哦(o))" in the response expresses a "surprise" mood meaning;

Then, it may be determined that the mood meaning matched with the modal particle "eh" is "surprise, and correspondingly, a recorded speech corresponding to the "surprise" mood meaning is obtained.

In practical application, it is possible to try to generate recorded speech of many types of mood meanings corresponding to each modal particle to ensure that a desired recorded speech can be obtained.

In 104, the obtained recorded speech is combined with a TTS-generated speech to perform TTS broadcast of the response.

Assume that the response is "Woow, my favorite song, Jay Chou, Tornado (Chinese expression: 哇(wa), 我(wo)的(de)最(zui)爱(ai), 周(zhou), 杰(jie)伦(lun) 龙(long)卷(juan)风(feng))", the whole response employs the TTS-generated speech and perform TTS broadcast of the response according to the prior art.

After the solution of the present disclosure is employed, a matched mood meaning is configured for the modal particle in the response, and the TTS is instructed to use the recorded speech of the mood meaning.

Correspondingly, it is feasible to combine the obtained recorded speech with the TTS-generated speech to perform the TTS broadcast of the response, namely, achieve combined broadcast of the recorded speech and the TTS-generated speech.

Specifically, during the broadcast, when the model particle corresponding to the obtained recorded speech needs to be broadcast, the obtained recorded speech is broadcast, otherwise the TTS-generated speech is broadcast.

Figure 2:
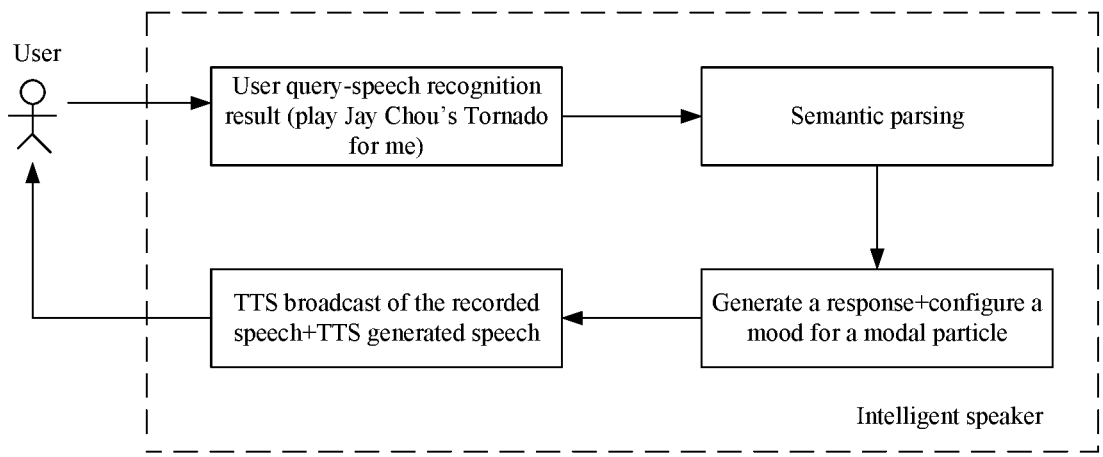
FIG. 2 is a schematic diagram of an interaction process of a use and a smart loudspeaker box according to the present disclosure.

Based on the above introduction, by taking the smart loudspeaker box as an example, FIG. 2 is a schematic diagram of an interaction process of the use and the smart loudspeaker box according to the present disclosure. As shown in FIG. 2, the speech recognition result of the user's query is "play Jay Chou's Tornado (Chinese expression: 给(gei)我(wo)播(bo)放(fang)周(zhou)杰(jie)伦(lun)的(de) 龙(long)卷(juan)风(feng))", semantic parsing is performed, the response is generated, a mood is configured for the modal particle in the response, namely, the recorded speech of the mood meaning is determined, and then the TTS broadcast combining the recorded speech and the TTS-generated speech is performed. Regarding specific implementation, please refer to the foregoing relevant depictions, and no detailed depictions are presented any more.

To conclude, the solution of the above embodiment is employed to, after generating the response corresponding to the user-input query, obtain a recorded speech of a mood meaning corresponding to the modal particle in the response and matched with the response, and then combine the obtained recorded speech with the TTS-generated speech to perform TTS broadcast of the response. Since the recorded speech having a mood meaning is introduced for the modal particle and the combined broadcast of the recorded speech and TTS-generated speech is implemented, it is possible to better perform emotional expression of the response and thereby improve the broadcasting effect of the response.

In addition, according to the solution of the above embodiment, many types of response-generating algorithms are set to generate different responses for the same demand, thereby achieving diversity of responses and thereby avoiding the problem that the user always gets the same answer, so that the answers become more natural and richer, and therefore the fresh feeling and intelligent feeling are enhanced for the user.

The above introduces the method embodiments. The solution of the present disclosure will be further described through an apparatus embodiment.

Figure 3:
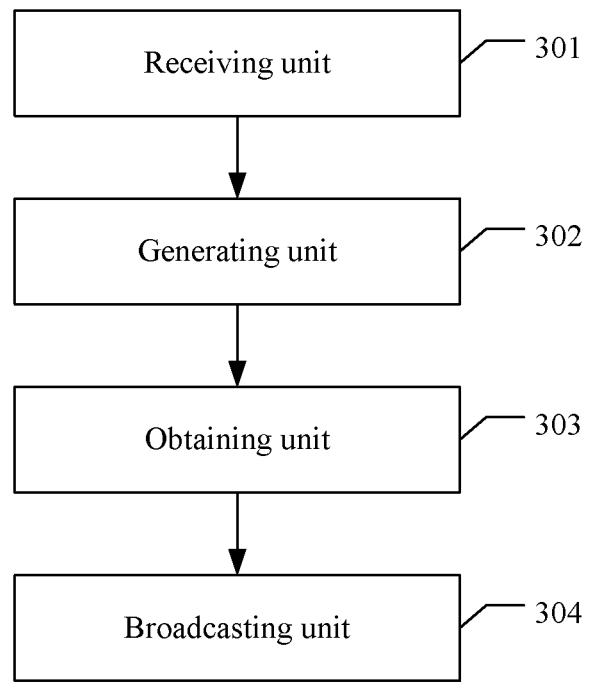
FIG. 3 is a block diagram of an embodiment of an apparatus for broadcasting a response according to the present disclosure.

FIG. 3 is a block diagram of an embodiment of an apparatus for broadcasting a response according to the present disclosure. As shown in FIG. 3, the apparatus comprises a receiving unit 301, a generating unit 302, an obtaining unit 303 and a broadcasting unit 304.

The receiving unit 301 is configured to obtain a user-input speech query and send the speech query to the generating unit 302.

The generating unit 302 is configured to generate a response corresponding to the query and send the response to the obtaining unit 303.

The obtaining unit 303 is configured to obtain a recorded speech of a mood meaning corresponding to a modal particle in the response and matched with the response, and send the response and the recorded speech to the broadcasting unit 304.

The broadcasting unit 304 is configured to combine the obtained recorded speech with a TTS-generated speech to perform TTS broadcast of the response.

The generating unit 302 may, after obtaining the user's query, first perform speech recognition for the query according to the prior art to obtain a speech recognition result, then perform semantic parsing for the speech recognition result, and determine a demand corresponding to the query.

Regarding a specific demand, e.g., a demand for playing a certain song of a certain singer, diverse responses rather than a single response may be provided.

Correspondingly, regarding each demand, M response-generating algorithms may be preset respectively, M is a positive integer larger than 1, and each response-generating algorithm corresponds to a different response.

As such, the generating unit 302 may, after determining the demand corresponding to the user-input query, select one response-generating algorithm from the M response-generating algorithms corresponding to the demand, and use the selected response-generating algorithm to generate the response.

No limitations are imposed on how to select. For example, a response-generating algorithm may be randomly selected from the M response-generating algorithms.

In addition, it is feasible to respectively pre-record speech corresponding to different mood meanings with respect to various modal particles that might be used in the responses.

At least one speech may be recorded with respect to each modal particle. Preferably, many types of speech may be recorded.

For example, speech indicative of mood meanings such as "question", "confirm" and "surprise" may be respectively recorded with respect to the modal particle "哦(o)".

As such, after the obtaining unit 303 obtains the response corresponding to the user-input query, the following processing may be respectively performed with respect to each modal particle in the response:

configuring a mood meaning matched with the response for the modal particle;

obtaining a recorded speech corresponding to the mood meaning;

as stated above, the modal particle corresponds to at least one pre-generated recorded speech, and each recorded speech corresponds to a different mood meaning.

Correspondingly, the broadcasting unit 304 may combine the obtained recorded speech with the TTS-generated speech to perform TTS broadcast of the response.

For example, when the model particle corresponding to the obtained recorded speech needs to be broadcast, the broadcasting unit 304 broadcasts the obtained recorded speech, otherwise broadcasts the TTS-generated speech, thereby implementing the combined broadcast of the recorded speech and the TTS-generated speech.

Reference may be made to corresponding depictions in the aforesaid method embodiment for a specific workflow of the apparatus embodiment shown in FIG. 3. The workflow is not detailed any more It can be seen that the solution of the above embodiment is employed to, after generating the response corresponding to the user-input query, obtain a recorded speech of a mood meaning corresponding to the modal particle in the response and matched with the response, and then combine the obtained recorded speech with the TTS-generated speech to perform TTS broadcast of the response. Since the recorded speech having the mood meaning is introduced for the modal particle and the combined broadcast of the recorded speech and TTS-generated speech is implemented, it is possible to better perform emotional expression of the response and thereby improve the broadcasting effect of the response.

In addition, according to the solution of the above embodiment, many types of response-generating algorithms are set to generate different responses for the same demand, thereby achieving diversity of responses and thereby avoiding the problem that the user always gets the same answer, so that the answers become more natural and richer, and therefore the fresh feeling and intelligent feeling are enhanced for the user.

Figure 4:
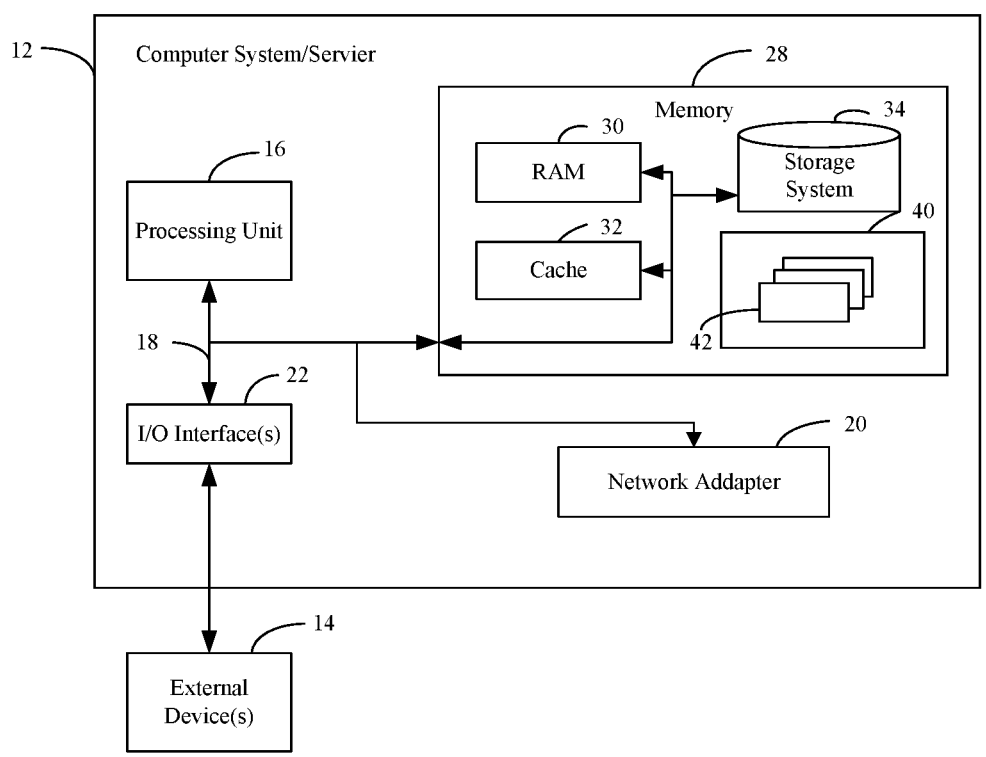
FIG. 4 is illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, obtain a user-input speech query, generate a response corresponding to the query, obtain a recorded speech of a mood meaning corresponding to a modal particle in the response and matched with the response, and combine the obtained recorded speech with a TTS-generated speech to perform TTS broadcast of the response.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for broadcasting a response based on artificial intelligence, wherein the method comprises:
   obtaining a user-input speech query;
   generating a response in a text form corresponding to the query;
   in response to determining that the response includes a modal particle, determining a mood meaning of the modal particle expressed in the response, and and obtaining a pre-recorded speech of the modal particle having the mood meaning; and
   combining the obtained pre-recorded speech with a Text-To-Speech-generated speech to perform Text-To-Speech broadcast of the response.

2. The method according to claim 1, wherein
the generating a response corresponding to the query comprises:
   determining a demand corresponding to the query;
   selecting one response-generating algorithm from M response-generating algorithms corresponding to the demand, M being a positive integer larger than 1; and
   using the selected response-generating algorithm to generate the response.

3. The method according to claim 2, wherein
the determining a demand corresponding to the query comprises:
   performing speech recognition for the query to obtain a speech recognition result; and
   determining a demand corresponding to the query by performing semantic parsing for the speech recognition result;
the selecting one response-generating algorithm from M response-generating algorithms corresponding to the demand comprises:
   randomly selecting one response-generating algorithm from the M response-generating algorithms corresponding to the demand.

4. The method according to claim 1, wherein
at least one pre-recorded speech is pre-generated for the modal particle, and each pre-recorded speech corresponds to a different mood meaning.

5. The method according to claim 1, wherein
the combining the obtained pre-recorded speech with a Text-To-Speech-generated speech to perform Text-To-Speech broadcast of the response comprises:
   when it is needed to broadcast the modal particle corresponding to the obtained pre-recorded speech, broadcasting the obtained pre-recorded speech, otherwise broadcasting the Text-To- Speech-generated speech.

6. A computer device, comprising a memory, a processor and a computer program which is stored on the memory and runs on the processor, wherein the processor, upon executing the program, implements the following operation:
   obtaining a user-input speech query;
   generating a response in a text form corresponding to the query;
   in response to determining that the response includes a modal particle, determining a mood meaning of the modal particle expressed in the response, and obtaining a pre-recorded speech of the mood meaning having the mood meaning; and
   combining the obtained pre-recorded speech with a Text-To-Speech-generated speech to perform Text-To-Speech broadcast of the response.

7. The computer device according to claim 6, wherein
the generating a response corresponding to the query comprises:
   determining a demand corresponding to the query;
   selecting one response-generating algorithm from M response-generating algorithms corresponding to the demand, M being a positive integer larger than 1; and
   using the selected response-generating algorithm to generate the response.

8. The computer device according to claim 7, wherein
the determining a demand corresponding to the query comprises:
   performing speech recognition for the query to obtain a speech recognition result; and
   determining a demand corresponding to the query by performing semantic parsing for the speech recognition result;

the selecting one response-generating algorithm from M response-generating algorithms corresponding to the demand comprises:
    randomly selecting one response-generating algorithm from the M response-generating algorithms corresponding to the demand.

9. The computer device according to claim 6, wherein pre-recorded speech is pre-generated for the modal particle, and each pre-recorded speech corresponds to a different mood meaning.

10. The computer device according to claim 6, wherein the combining the obtained pre-recorded speech with a Text-To-Speech-generated speech to perform Text-To-Speech broadcast of the response comprises:
    when it is needed to broadcast the modal particle corresponding to the obtained pre- recorded speech, broadcasting the obtained pre-recorded speech, otherwise broadcasting the Text- To-Speech-generated speech.

11. A non-transitory computer-readable storage medium on which a computer program is stored, wherein the program, when executed by a processor, implements the following operation:
    obtaining a user-input speech query;
    generating a response in a text form corresponding to the query;
    in response to determining that the response includes a modal particle, determining a mood meaning of the modal particle expressed in the response, and obtaining a pre-recorded speech of the modal particle having the mood meaning; and
    combining the obtained pre-recorded speech with a Text-To-Speech-generated speech to perform Text-To-Speech broadcast of the response.

12. The non-transitory computer-readable storage medium according to claim 11, wherein
    the generating a response corresponding to the query comprises:
        determining a demand corresponding to the query;
        selecting one response-generating algorithm from M response-generating algorithms corresponding to the demand, M being a positive integer larger than 1; and
        using the selected response-generating algorithm to generate the response.

13. The non-transitory computer-readable storage medium according to claim 12, wherein
    the determining a demand corresponding to the query comprises:
        performing speech recognition for the query to obtain a speech recognition result; and
        determining a demand corresponding to the query by performing semantic parsing for the speech recognition result;
    the selecting one response-generating algorithm from M response-generating algorithms corresponding to the demand comprises:
        randomly selecting one response-generating algorithm from the M response-generating algorithms corresponding to the demand.

14. The non-transitory computer-readable storage medium according to claim 11, wherein
    at least one pre-recorded speech is pre-generated for the modal particle, and each pre-recorded speech corresponds to a different mood meaning.

15. The non-transitory computer-readable storage medium according to claim 11, wherein
    the combining the obtained pre-recorded speech with a Text-To-Speech-generated speech to perform Text-To-Speech broadcast of the response comprises:
    when it is needed to broadcast the modal particle corresponding to the obtained pre-recorded speech, broadcasting the obtained pre-recorded speech, otherwise broadcasting the Text-To-Speech-generated speech.

* * * * *